United States Patent
Nestle et al.

(10) Patent No.: US 6,854,340 B2
(45) Date of Patent: Feb. 15, 2005

(54) FLOW MEASURING DEVICE

(75) Inventors: Volker Nestle, Esslingen (DE);
Winfried Schulz, Neuhausen (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 10/809,265

(22) Filed: Mar. 25, 2004

(65) Prior Publication Data

US 2004/0194554 A1 Oct. 7, 2004

(30) Foreign Application Priority Data

Apr. 1, 2003 (DE) ..................................... 203 05 230 U

(51) Int. Cl.$^7$ .............................................. G01F 1/38
(52) U.S. Cl. .................................................. 73/861.49
(58) Field of Search ........................ 73/861.49, 861.64, 73/861.63, 861.62

(56) References Cited

U.S. PATENT DOCUMENTS

| | | | |
|---|---|---|---|
| 4,524,616 A | | 6/1985 | Drexel et al. |
| 4,651,572 A | | 3/1987 | Albertz et al. |
| 5,127,173 A | * | 7/1992 | Thurston et al. ............... 73/202 |
| 5,426,975 A | * | 6/1995 | Stark ........................... 73/202 |
| 5,533,549 A | * | 7/1996 | Sherman ..................... 137/557 |
| 6,339,963 B1 | * | 1/2002 | Torkildsen ................ 73/861.63 |

FOREIGN PATENT DOCUMENTS

| | | |
|---|---|---|
| AT | 96 883 | 5/1924 |
| DE | 34 08 779 C2 | 3/1985 |
| DE | 35 05 833 A1 | 8/1986 |
| DE | 201 00 874.2 | 3/2001 |
| DE | 100 46 618 A1 | 4/2002 |
| DE | 202 08 716.6 | 8/2002 |

\* cited by examiner

*Primary Examiner*—Edward Lefkowitz
*Assistant Examiner*—Jewel V. Thompson
(74) *Attorney, Agent, or Firm*—Hoffmann & Baron, LLP

(57) ABSTRACT

A flow measuring device comprising a housing in which a principal flow duct extends in which pressure drop producing means are located responsible for a pressure drop of the pressure flowing through and in the wall of the duct the tapping openings of a plurality of tapping ducts connected with a flow ascertaining means arranged in the housing are provided. The principal flow duct, including the pressure drop producing means and the tapping openings, is a component of a sleeve-like duct insert inserted into the housing coaxially. The inner face of the socket and the outer face of the duct insert are so designed in the form of interfaces that during assembly of the duct insert a correctly coordinated fluid connection of the duct sections in the housing and in the inserts of the tapping ducts is ensured.

20 Claims, 3 Drawing Sheets

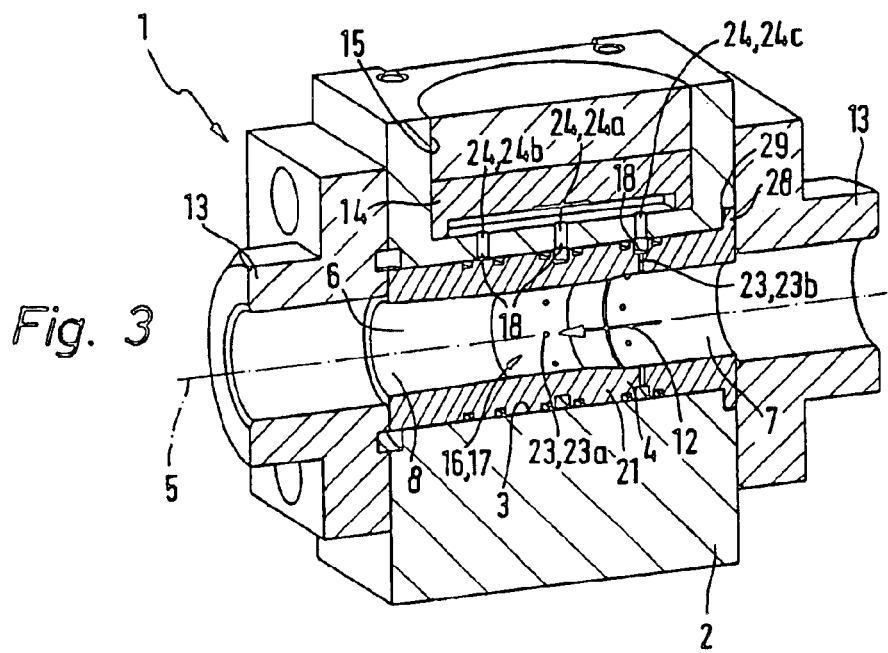
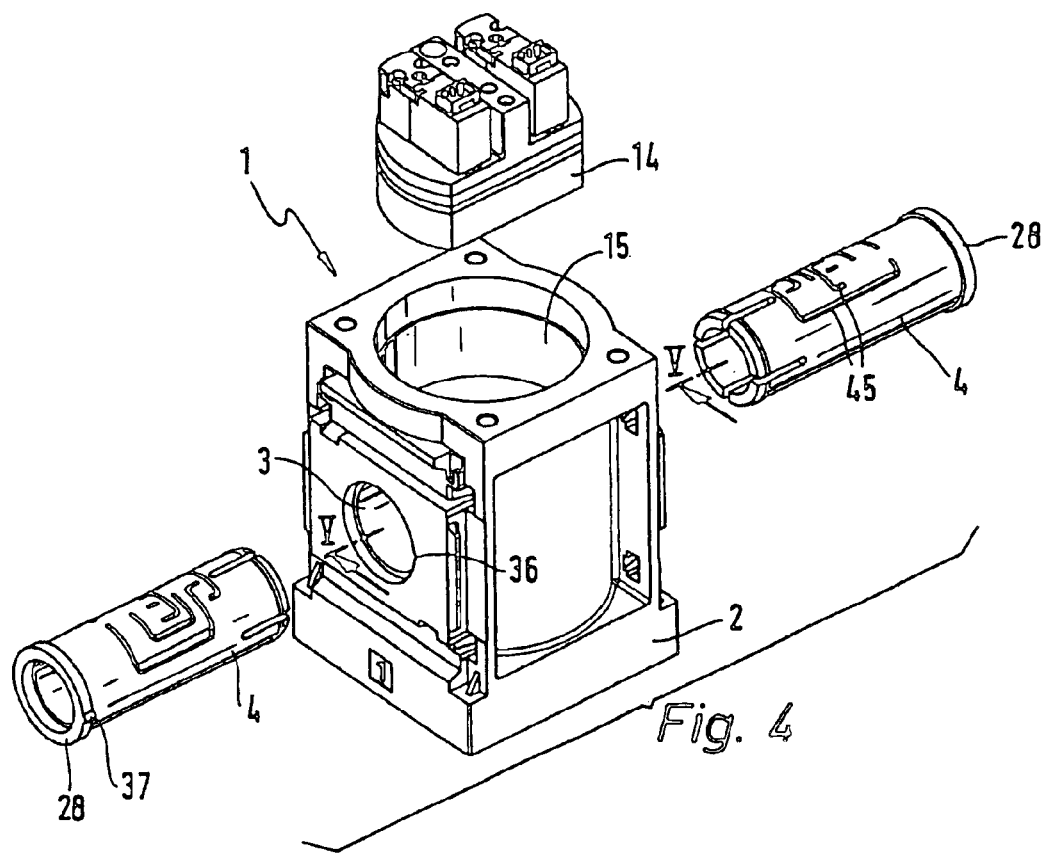

FLOW MEASURING DEVICE

BACKGROUND OF THE INVENTION

The invention relates to a flow measuring device comprising a housing in which a principal flow duct extends in which a pressure drop producing means producing a pressure drop in the medium flowing through is located and on whose duct wall the tapping openings of a plurality of tapping ducts connected with a flow ascertaining means arranged in or on the housing, are provided.

THE PRIOR ART

A flow measuring device disclosed in the German patent publication (utility model) 20,208,716 comprises a tubular housing, in which a principal flow duct is formed in the course of which there is a laminar flow element, which comprises a plurality of capillary ducts causing a pressure drop in fluid flowing through them. Two tapping ducts opening at a distance apart from each other upstream from and downstream from the laminar flow element are connected with a flow ascertaining means mounted on the housing and define a gage duct, in which owing to a pressure differential a bypass current is caused, whose flow may be ascertained using a mass flow sensor means as part of the flow ascertaining means. On the basis of the data or readings the rate in the principal flow duct may be determined.

In the case of a flow measuring device described in the German patent publication (utility model) 20,100,874 as well the flow rate is determined in a principal flow duct formed directly in a housing. To form the pressure drop producing means the principal flow duct however in this case is designed with a flow cross section decreasing in the flow direction of the pressure medium so that there is a geometry in the form of a conically tapering nozzle. To ascertain the flow rate the pressure differential between duct region with different flow cross sections is measured to serve as a measure for the flow speed. It is in this manner that the flow measurement is based on pressure measurement.

All known designs share the common feature that in accordance with the measurement requirements of the user specifically customized flow measuring devices must be provided. If for example the flow rates to be measured vary, flow measuring devices are utilized having suitably different measure ranges. The costs involved here are relatively high.

SHORT SUMMARY OF THE INVENTION

One object of the present invention is to suggest measures with which adaptation to different measurement eventualities may be taken into account with reduced complexity.

In order to achieve these and/or other objects appearing from the present specification, claims and drawings, in the present invention the principal flow duct, including the pressure drop producing means and the tapping openings, is a component of a sleeve-like duct insert inserted into a socket in the housing coaxially, the tapping ducts being composed of housing duct sections extending in the housing and opening at the inner face of the socket and of duct sections which extend in the wall of the duct insert and open at the outer face of the duct insert, the inner face of the socket and the outer face of the duct insert being designed as interfaces ensuring a correctly associated fluid link between the duct sections in the housing and in the insert.

It is in this manner that different measuring needs of the user may be taken into account, because selectively a duct insert which has the desired specification may be fitted in the housing of the flow measuring device. The housing itself and frequently the flow ascertaining means and the flow ascertaining means as well may as a rule be kept irrespectively of the actually employed duct insert so that a substantial economy in costs may be expected. The tapping ducts extending between the principal flow duct and the flow ascertaining means are divided into housing and insert duct sections, and by having suitably designed interfaces on the mutually facing inner and outer faces of the socket and of the duct insert a coordinated fluid linking is ensured irrespectively of the actually employed duct insert. The design, separate from that of the housing, of the duct insert also facilitates the manufacture of the frequently complex features needed for the production of the desired pressure drop.

Further advantageous developments of the invention are defined in the claims.

It is more particularly convenient to design the duct insert in the form of an inserted part, which is able to be fitted by a simple axial plugging operation into the socket of the housing. For locking it in place detent means are more especially suitable which may be handled without a tool and in the case of need may be released again.

To the extent it is necessary owing to the design of the interfaces, suitable positioning means may be provided on the housing and on the duct insert, which set a certain angular position of the duct insert in relation to the socket of the housing and accordingly favor installation without any danger of confusion.

A high degree of accuracy combined with a relatively low dependency on the type of flow impact owing to the pressure medium may be obtained if the respective tapping duct opens into the principal flow duct at a plurality of tapping openings distributed about the periphery of the duct, such tapping openings communicating jointly with an annular groove formed at the outer periphery of the duct insert. The pressure signals produced are accordingly averaged so that irregularities in the flow conductance in the tapping cross sections, which result from the type and direction of the impacting flow, are minimized.

A particularly advantageous further development of the invention contemplates one the same duct insert being able to be selectively inserted into one of two mutually opposite longitudinal directions in the socket in order to render possible flow measurement in either of the two flow directions of the pressure medium without undertaking any other modifications of the flow measuring device. Since the housing of the flow measuring device as a rule is dependent on particular orientations during operation—for example owing to adjustment and/or display means being arranged on one particular side—so far in the prior art for flow measurement in the case of oppositely directed flows an overall replacement of the flow measuring device has been necessary. Now it is sufficient to turn around the duct insert and with an orientation changed by 180° to install it in the socket in the housing.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

FIG. 3 shows the flow measuring device of FIG. 1, the duct insert being installed with a longitudinal orientation opposite to that of FIG. 1.

FIG. 4 shows a further possible design of the flow measuring device in a perspective, exploded representation, one and the same duct insert being illustrated twice in order to indicate the possibilities of installation from two opposite sides.

DETAILED ACCOUNT OF WORKING EMBODIMENTS OF THE INVENTION

Figure 1:
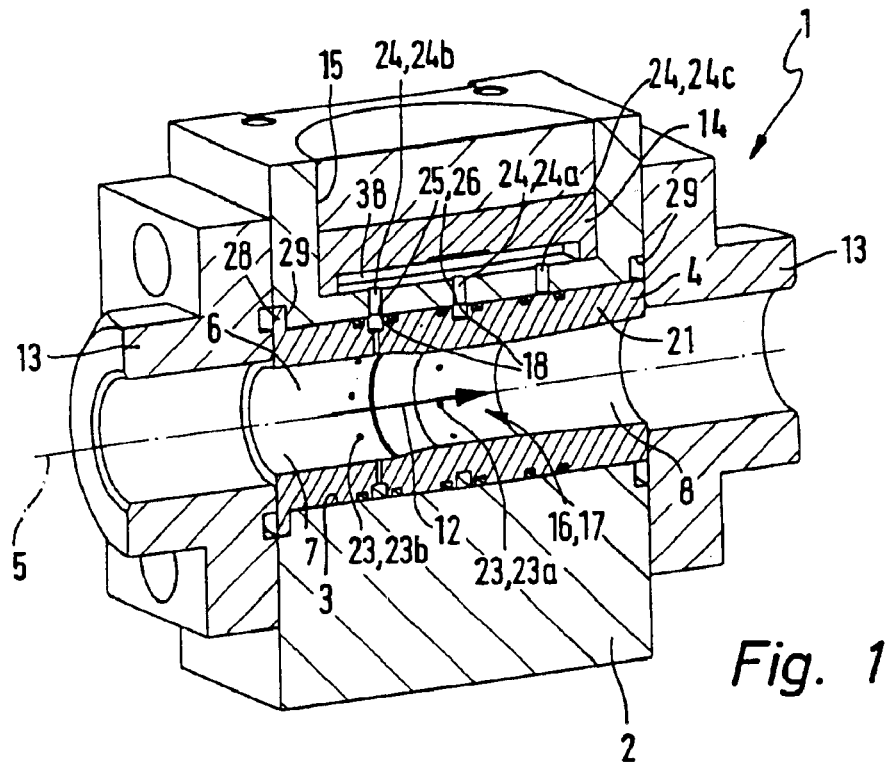
FIG. 1 shows a first possible design of the flow measuring device in a simplified longitudinal section.

The flow measuring devices generally referenced 1 each possess a housing 2, which may be more particularly designed like a block and have a preferably circularly cylindrical socket 3 extending through it. In the socket 3 a sleeve-like component is inserted which is termed a duct insert and whose external geometry is complementary to the socket 3. This component defines a principal flow duct 6 extending through the housing 2 in one longitudinal direction 5.

The principal flow duct 6 possesses an inlet 7 at one end and an outlet 8 at the other end. At the inlet 7 a pressure medium may be supplied to the principal flow duct 6, which after flowing through the principal flow duct 6 emerges again at the outlet 8. The flow direction through the principal flow duct 6 is indicated by an arrow at 12.

Figure 2:
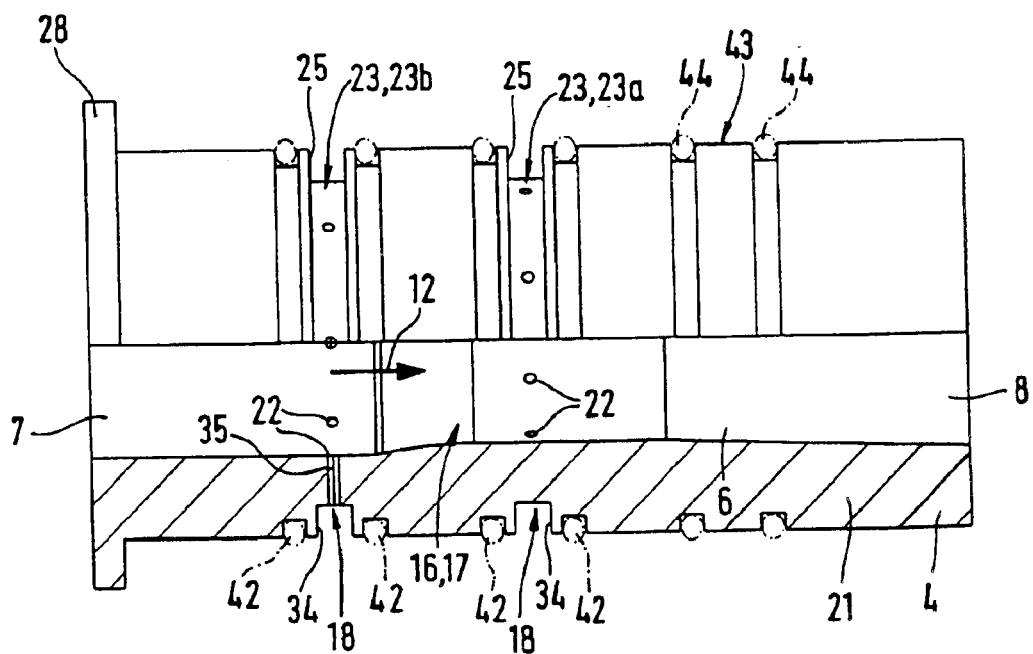
FIG. 2 shows, in a separate semi-cross section, the duct insert employed in the flow measuring device of FIG. 1.

In the case of the working example of FIG. 1 through 3 the housing carries two connection bodies 13 on it in an extension of the duct insert 4 at either end, such bodies rendering possible the connection of fluid lines (not illustrated) for the supply and exit of the pressure medium. The pressure medium may be hydraulic or gaseous. In the working embodiment compressed air is employed.

Figure 5:
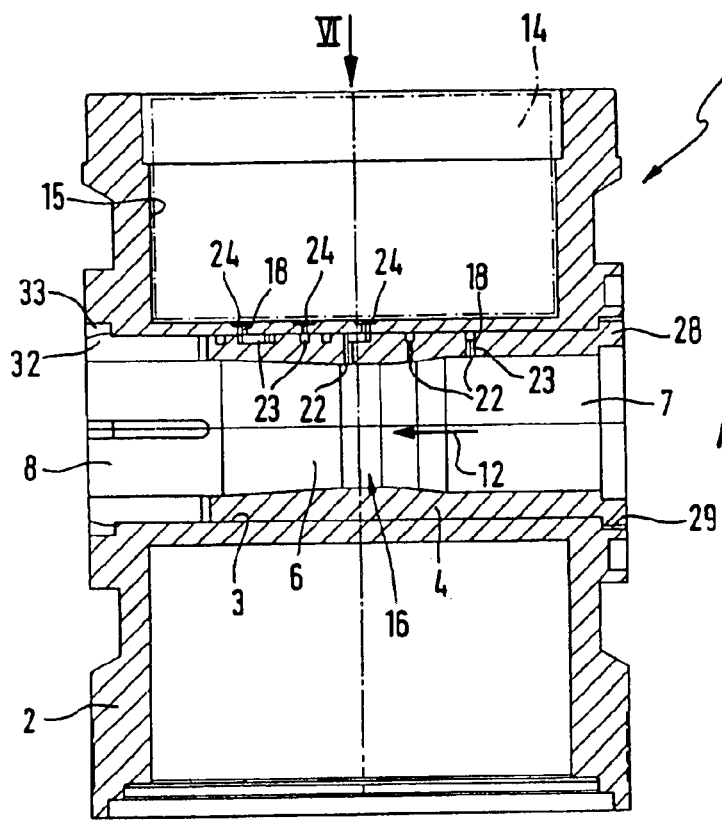
FIG. 5 shows the assembled flow measuring device of FIG. 4 in longitudinal section.
Figure 6:
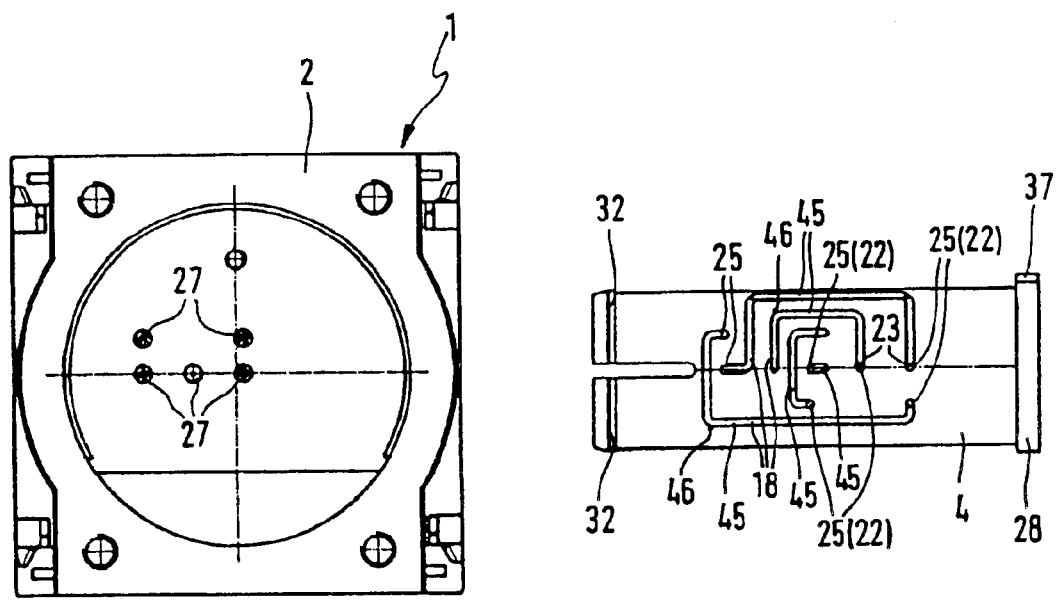
FIG. 6 shows the arrangement of FIG. 5 in a plan view looking in the direction of the arrow VI prior to insertion of the duct insert and with the flow ascertaining means removed.

In the working embodiment of FIGS. 4 through 6 there are no separate connection bodies 13. Here the provision is such that compressed air conditioning devices are mounted as an extension at either end of the duct insert 4, through which the supply and exit of the pressure medium takes place. These devices, generally termed servicing devices, serve for example for regulation of pressure or for filtration of the compressed air.

Thus it will be clear that the flow measuring device may be designed both as an independent and self-contained device or as a component of any appropriate fluid power instrumentality, as for instance a servicing device for conditioning compressed air, within which it is utilized for flow measuring.

At the periphery of the socket 3 the housing 2 is provided with a recess 15, in which a flow ascertaining means 14 is inserted. Thus the flow ascertaining means 14 is completely sunk into the housing 2. As an alternative the flow ascertaining means 14 could be also externally mounted on the housing 2.

In the interior of the principal flow duct 6 there are pressure drop producing means 16. There are responsible for a pressure drop in the pressure medium flowing through them so that upstream from the pressure drop producing means 16 there is a higher static pressure than downstream from same.

The pressure drop producing means 16 could for example be constituted by a so-called laminar flow element. In the embodiment they are defined by reduction in the cross section of the principal flow duct 6 in the flow direction 12. This duct section is in the following termed a nozzle section 17. It may have the form of a venturi nozzle.

At the nozzle section 17 a plurality of tapping ducts 18 open at tapping openings spaced apart in the longitudinal direction of the duct insert 4. The ducts 18 respectively extend through the wall 21 of the duct insert 4 and the housing 2, and lead to the flow ascertaining means 14 and thus connect it with the tapping openings 22.

The tapping ducts 18 are consequently composed partly of duct sections 23 in the insert and partly of a duct sections 24 in the housing, the duct sections 23 in the insert extending between the tapping openings 22 and first connection openings 25 provided on the outer face of the duct insert 4 and the duct sections 24 in the housing extend between second connection openings 26 (opening at the inner face of the socket 3) and third connection openings 27 connected with the flow ascertaining means 14. In the working embodiments the third connection openings 27 are at the floor of the recess 15 receiving the flow ascertaining means 14.

The principal flow duct 6 is accordingly in both the working examples, including the pressure drop producing means 16, and the tapping openings 22, a component of the duct insert 4 coaxially inserted into the socket 3, the peripheral outer face of the duct insert 4 and the facing inner face of the socket 3 functioning, by virtue of a suitable distribution of the first and second connection openings 25 and 26 as interfaces, which are responsible for correctly coordinated fluid linking between the duct sections 23 in the insert and the duct sections 24 in the housing.

Therefore there is the possibility, in the case of the requirements of actual measurements being performed, of inserting alternative different duct inserts 4 in one and the same socket 3, such inserts more particularly differing as regards the design of the pressure drop producing means, a suitable design of the interface provided on the duct insert 4 allowing at any time for a linking with the unchanged interface of the housing 2 in such a manner that flow ascertainment may be performed without replacement of the flow ascertaining means 14.

In the two working examples the duct insert 4 is designed in the form of an inserted part. At the rear end section it comprises a peripheral, radially projecting abutment collar 28 and during assembly is inserted from one end of the socket 3 so far in the socket 3 that such abutment collar 28 strikes against a step 29 of the housing. By virtue of such abutment means 28 and 29, which may be also designed in some other form, the depth of insertion of the duct insert 4 may be exactly set in relation to the socket 3 so that the interfaces formed by the first and second connection openings 25 and 26 exactly match each other.

The axial location of the inserted duct insert 4 in relation to the housing 2 is in the working example of FIGS. 1 through 3, ensured by the connection bodies 13 mounted on the housing 2 with a partial radial overlap of the end face of the duct insert 4. If the connection body 13 mounted at the abutment collar 28 is taken off, the duct insert 4 may be readily removed from the socket 3 and for example replaced by a duct insert 4 having a different specification.

In order to individualize different duct inserts and to make them readily identifiable to prevent confusion the physically different duct inserts 4 may have colored markings or other insignia.

This applies moreover also for the duct insert 4 in accordance with FIGS. 4 through 6, which differs from the above mentioned design inter alia because it may be secured in the socket 3 using detent means allowing it to be removed.

Preferably the duct insert 4 is longitudinally slotted at its front end section more than once so that there is a plurality of radially elastic detent arms 32 distributed about the periphery, which in the inserted condition of the duct insert 4 hook around a preferably annular housing step 33. The detent or catch arms 32 are in this case biased into the detent or holding position and may be temporarily bent radially inward for the removal of the duct insert 4.

A further design of the detent means 32 and 33 for removable location of the duct insert 4 would also be possible.

In the case of the duct insert 4 in accordance with FIGS. 1 through 3 the first connection openings 25 are constituted by annular grooves 34 spaced apart in the longitudinal direction, which are provided in the outer periphery of the duct insert 4 and extend concentrically about it. This design offers the advantage that the duct insert 4 may be inserted at any desired angular position into the socket 3. The connection with the associated, aligned second connection opening 26 is ensured at any time.

Particularly in the case of such a design there is also the advantageous possibility indicated in FIG. 2 of providing one and the same tapping duct simultaneously with a plurality of tapping openings 22, which are constituted by the duct sections 35, which are distributed about the principal flow duct 6 and respectively at one end open into the principal flow duct 6 and at the other open into the associated annular groove 34. The tapped pressure signals are accordingly averaged and hence measurement inaccuracies are reduced. Associated with this there is a stabilization of the signal, something which simplifies the employment of the flow measuring device and extends the range of application.

In the working embodiment illustrated in FIGS. 4 through 6 a particular angular position of the duct insert 4 is required in the socket 3. Accordingly first and second positioning means 36 and 37 are provided on the housing 2 and on the duct insert 4, such positioning means allowing full insertion of the duct insert 4 only in the case of a particular angular position and accordingly the desired angular position of the duct insert 4 is set thereby in relation to the housing 2 and, respectively, the socket 3. In the working embodiment the second positioning means 37 are constituted by a spur formed on the outer periphery of the abutment collar 28, which can lock into a recess 15, defining the first positioning means 36, in the housing.

In the working embodiment illustrated in FIGS. 1 through 3 the flow ascertaining means 14 possesses a mass flow sensor means (not illustrated) functioning on the calorimetric principle. This means is arranged at some point along a bypass duct 38, which connects two tapping ducts 18 with one another and allows bypassing of the pressure drop producing means 16 by the pressure medium flow, while itself producing a precisely set pressure drop. The mass flow sensor means finds or ascertains the mass flow through the bypass duct, which has a relatively small diameter in comparison with the principal flow duct, such mass flow being correlated in an evaluating means of the flow ascertaining means 14 with the flow in the principal flow duct 6.

In the working embodiment illustrated in FIGS. 4 through 6 a flow ascertaining means 14 is utilized, which operates on the basis of the so-called effective pressure principle. In this case by way of at least two tapping ducts 18 the static pressure obtaining at the tapping openings 22 is tapped in order to find the differential pressure in a differential pressure sensor means of the flow ascertaining means. By the intermediary of further condition data such as absolute pressure, temperature and humidity, which may also be tapped by way of the tapping ducts 18 and the principal flow duct 6, the instantaneous flow is computed.

While in the case of the working example of FIGS. 1 through 3 only two tapping ducts 18 are present, the duct insert 4 of FIGS. 4 through 6 possesses three tapping ducts 18, something which more particularly furthermore permits intermediate tapping in the case of the measurement range being exceeded, as is described by way of example in the said German patent publication (utility model) 20,100,874.

A further particular advantage of both working examples is that one and the same duct insert 4 may be selectively inserted into the socket 3 in one of two mutually opposite longitudinal directions in order to render possible flow measurement in either flow direction of the pressure medium.

In this respect two sections 23 of the tapping ducts 18 in the insert extend in the wall 21 of the duct insert 4 in the working embodiment of FIGS. 1 through 3, and such sections open at axially spaced points into the principal flow duct 6 and communicate respectively with one of the two above mentioned annular grooves 34 at the outer periphery of the duct insert 4. On the other hand three sections 4 of the tapping ducts 17 extend in the wall of the housing 2, to communicate on the one hand with a flow ascertaining means 14 and on the other hand to open at axially spaced point peripherally in the socket 3. By suitable positioning of the first connection openings 25 formed by the annular grooves 34 and of the second connection openings 26 belonging to the duct sections 24 in the housing it is possible to ensure that a first (23a) section of the duct sections 23 in the insert may communicate with a first (24a) duct section in the housing independently of the longitudinal alignment of the duct insert 4, whereas the second duct section 23b in the housing communicates, dependent on the longitudinal alignment of the duct insert 4, with the second duct section 24b (FIG. 1) in the housing or with the third duct section 24b (FIG. 3) in the housing.

Irrespectively of the longitudinal orientation of the duct insert 4a bypass flow take place in the desired direction in order to obtain an exact result of measurement.

In order to prevent incorrect flow of pressure medium at the two interfaces, that is to say between the outer periphery of the duct insert 4 and the inner periphery of the socket 3, the two annular grooves 34 are respectively flanked by a seal ring 42 axially on either side concentrically surrounding the duct insert 4. The seal rings 42 are preferably also seated in annular grooves cut into the outer periphery of the duct insert 4.

Since both and also the third duct section 24b and 24c in the housing open into the bypass duct 38 it is necessary to prevent pressure medium leaving the duct section which is not active at a given time. Accordingly in that portion of the outer periphery of the duct insert 4, which—dependent on the insertion direction—is opposite the second connection opening 26 of the second or third connection opening 26 in the housing, there is a peripherally extending sealing zone 43, which like the annular grooves 34 is flanked on either side of the annular sealing means 44. The pressure medium is accordingly retained in the sealing zone 43 and is prevented from flowing out.

In the working embodiment illustrated in FIGS. 4 through 6 in all there are five tapping ducts 18. Their tapping openings 22 lying in the principal flow duct 6 are in indicated in parentheses in FIG. 6 in order to make clear that they lie in a plane other than the plane illustrated. Each of these tapping openings 22 communicates by way of the associated duct section 23 in the insert by way of the associated duct section 23 simultaneously with two first connection openings 25 provided on the outer periphery of the duct insert 4, the respective pairs of first connection openings 25 being connected together by a groove-like connection duct 45 formed on the outer periphery of the duct insert 4.

In the working embodiment a respective first connection opening 25 is radially opposite the associated tapping opening 22, the connection of the respectively other first connection opening 25 taking place from this position by way of a groove-like connection duct 45.

The two first connection openings 25 associated with a respective tapping opening 22 are now so distributed about the outer periphery of the duct insert 4 that one and the same duct section 24 in the housing communicates (in accordance with the instantaneous longitudinal orientation of the duct insert 4) either by way of the one or the other first connection opening 25 with the associated tapping opening 22.

As shown in FIGS. 4 and 6 the individual pairs of first connection openings 25 may be readily connected together using complexly designed groove-like connection ducts 45, because such connection ducts 45 are located on the outer periphery of the duct insert 4 and accordingly an economic shaping during manufacture by injection molding is possible preferably using a plastic material for the duct insert 4.

For mutual sealing of the connect ducts 45 from each other each connection-duct 45 has a seal 46 surrounding it around the full periphery, such seal being formed on the outer periphery of the duct insert 4 for a permanent sealing action.

The installation of the duct insert 4 takes place in a longitudinal orientation turned through 180° and is preferably performed by insertion of the duct insert 4 selectively through the one or through the other end opening in the socket 3 into the same.

What is claimed is:

1. A flow measuring device comprising a housing in which a principal flow duct extends in which a pressure drop producing means producing a pressure drop in the medium flowing through is located and on whose duct wall the tapping openings of a plurality of tapping ducts connected with a flow ascertaining means arranged in or on the housing, are provided, wherein the principal flow duct, including the pressure drop producing means and the tapping openings, is a component of a sleeve-like duct insert inserted into a socket in the housing coaxially, the tapping ducts being composed of housing duct sections extending in the housing and opening at the inner face of the socket and of duct sections which extend in the wall of the duct insert and open at the outer face of the duct insert, the inner face of the socket and the outer face of the duct insert being designed as interfaces ensuring a correctly associated fluid link between the duct sections in the housing and in the insert.

2. The flow measuring device as set forth in claim 1, wherein the duct insert is in the form of an inserted part.

3. The flow measuring device as set forth in claim 1, comprising detent means for the detachable fixation of the duct insert, inserted into the socket, in relation to the housing.

4. The flow measuring device as set forth in claim 3, wherein the duct insert is multiply slotted at a front end thereof, a plurality of radially resiliently elastic detent arms being formed, which in the mounted state of the duct insert cooperate with the housing to form a releasable catch.

5. The flow measuring device as set forth in claim 1, comprising positioning means formed on the housing and on the duct insert, which are able to make interlocking engagement with one another for setting a predetermined angle position of the duct insert.

6. The flow measuring device as set forth in claim 1, comprising abutment means provided on the housing and on the duct insert for setting the insertion depth of the duct insert.

7. The flow measuring device as set forth in claim 1, wherein the pressure drop producing means are constituted by a duct section whose cross section is tapered in the flow direction of the pressure medium.

8. The flow measuring device as set forth in claim 1, wherein at least one tapping duct possesses a plurality of tapping openings distributed at the same axial level in the peripheral direction about the duct periphery, such tapping openings communicating jointly with an annular groove formed on the outer periphery of the duct insert.

9. The flow measuring device as set forth in claim 1, wherein the duct insert is able to be inserted selectively in two opposite longitudinal directions in order to render possible flow measurement in both directions of flow of the pressure medium.

10. The flow measuring device as set forth in claim 9, wherein the duct insert is able to be inserted from opposite ends into the socket.

11. The flow measuring device as set forth in claim 9, wherein in the wall of the duct insert two duct sections contained in the insert extend, which at axially spaced points open into the principal flow duct and which respectively communicate with an annular groove formed at the outer periphery of the duct insert, and wherein three sections of the tapping ducts in the housing communicate on the one hand with the flow ascertaining means and on the other hand open at axially spaced points into the socket, the interfaces on either side being so designed that a first section of the duct sections in the insert communicates, irrespectively of the longitudinal orientation of the duct insert with a first duct section in the housing, whereas the second duct section in the insert communicates with the second or with the third duct section in the housing dependent on the longitudinal orientation of the duct insert.

12. The flow measuring device as set forth in claim 11, wherein the duct insert possesses sealing means at the outer periphery, which by virtue of cooperation with the inner periphery of the socket seal off the second or third duct section in the housing presently not communicating with a duct section in the housing.

13. The flow measuring device as set forth in claim. 11, wherein the annular grooves are flanked axially on either side by a sealing ring concentrically surrounding the duct insert.

14. The flow measuring device as set forth in claim 13, wherein the duct sections in the insert at least partly respectively possess two connection openings provided on the outer periphery of the duct insert, such connection openings being so placed at different positions that one and the same duct section in the housing communicates, in accordance with the longitudinal orientation of the duct insert, either with the one or with the other connection opening.

15. The flow measuring device as set forth in claim 14, wherein one of the two connection openings is radially flush with the associated tapping opening.

16. The flow measuring device as set forth in claim 14, wherein the two connection openings are connected together by a groove-like connecting duct formed at the outer periphery of the duct insert.

17. The flow measuring device as set forth in claim 16, wherein each groove-like connecting duct is surrounded by a seal secured on the duct insert.

18. The flow measuring device as set forth in claim 1, designed as a component of a compressed air servicing device or of another fluid power device.

19. The flow measuring device as set forth in claim 1, comprising a plurality of duct inserts able to be alternatively put in the socket, such duct inserts having different specifications.

20. The flow measuring device as set forth in claim 19, wherein the different duct inserts are individualized by color codes or other distinguishing insignia.

* * * * *